Aug. 21, 1923.
D. T. HASTINGS
STEERING GEAR
Filed Oct. 31, 1921

1,465,667

Inventor
Donald T. Hastings

Attorneys

Patented Aug. 21, 1923.

1,465,667

UNITED STATES PATENT OFFICE.

DONALD T. HASTINGS, OF DETROIT, MICHIGAN.

STEERING GEAR.

Application filed October 31, 1921. Serial No. 511,757.

*To all whom it may concern:*

Be it known that I, DONALD T. HASTINGS, a citizen of the United States of America, residing at Detroit, in the county of Wayne and State of Michigan, have invented certain new and useful Improvements in Steering Gears, of which the following is a specification, reference being had therein to the accompanying drawings.

The invention relates to steering gears and refers more particularly to steering columns of the concentric tube type. Heretofore, it has been necessary to accurately fit the tubes forming a column so that they could be operated readily and at the same time would not rattle. With my invention, this accurate fitting of the tubes is not necessary, and furthermore, they are prevented from rattling and in addition, lubricated. With this object in view, the invention resides in the novel features as more fully hereinafter set forth.

Figures 1, 2:
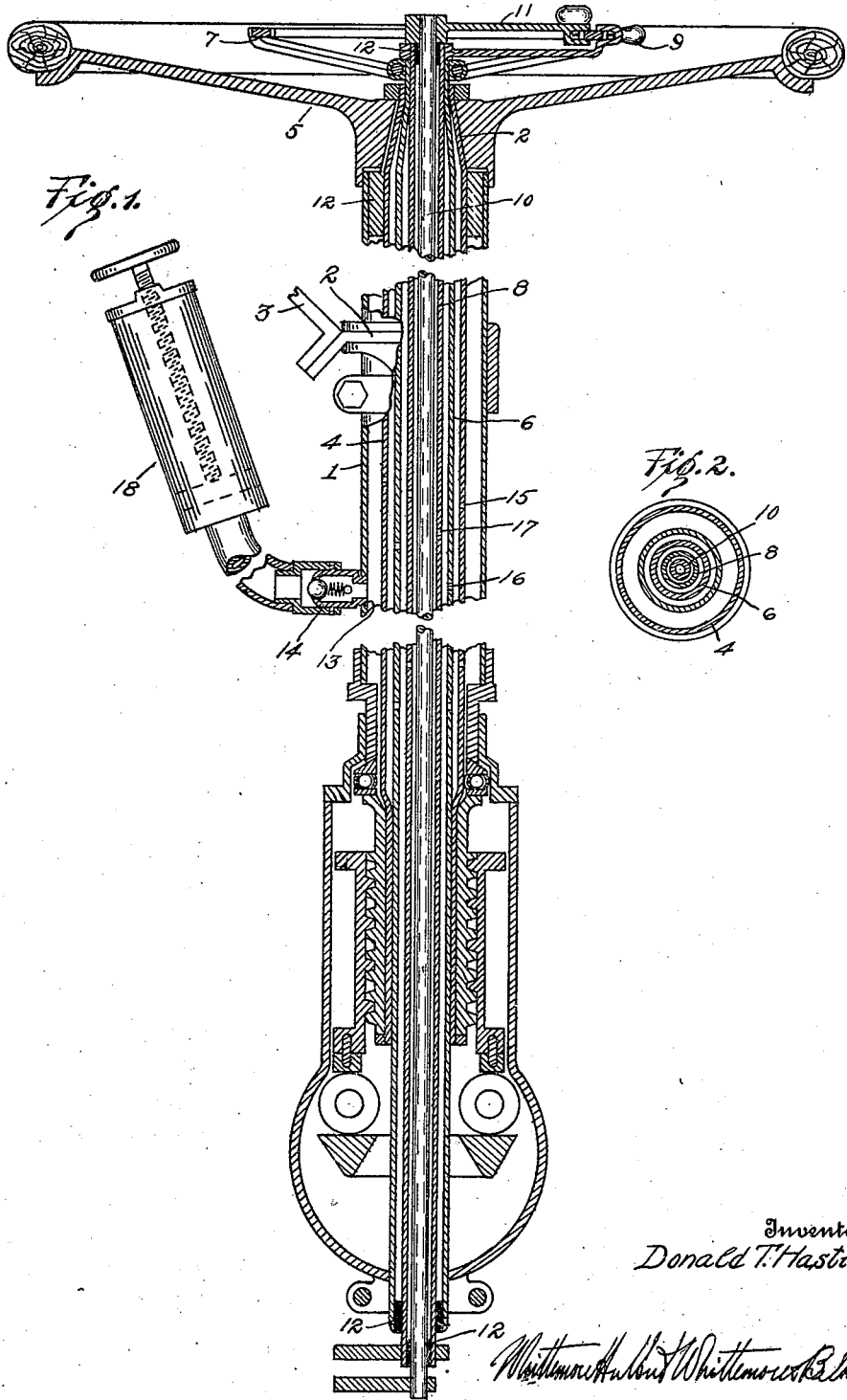
Figure 1 is a longitudinal section through a steering column embodying my invention.
Figure 2 is a transverse section therethrough.

1 is an outer stationary tube mounted in the supporting bracket 2 upon the dash 3 of a motor vehicle. 4 is a second rotatable tube within the outer tube 1 and secured at its upper end to the steering wheel 5 and at its lower end to suitable mechanism for operating the front ground wheels of the motor vehicle. 6 is a third stationary tube within the second tube 4 and supporting at the upper end, the quadrant 7. 8 is a fourth rotatable tube within the third tube 6 and secured at its upper end to the throttle control lever 9 and at its lower end to suitable mechanism for operating the throttle valve. 10 is a fifth rotatable tube within the fourth rotatable tube 8 and connected at its upper end to the spark control lever 11 and at its lower end to suitable mechanism for operating the spark timer. These tubes are concentrically arranged and have at their opposite ends the bushings 12 for closing the space therebetween. As thus far described, the construction of steering gear including the steering column is commonly used.

In order to prevent rattling of the tubes and at the same time to lubricate the tubes, I have provided means for introducing a plastic lubricant filler to completely fill the space between the columns. In detail, the outer tube 1 has the opening 13 therein for receiving the valve controlled nipple 14. The second, third and fourth tubes, 4, 6 and 8 respectively, are each provided with the series of holes 15, 16 and 17 respectively for placing the spaces between all the tubes in communication with each other. 18 is a suitable grease gun adapted to be connected to the valve controlled nipple 14 and to force grease under pressure into the spaces between the tubes, this grease passing through the apertures 15, 16 and 17. The grease is forced into the steering column until all the spaces between the tubes are completely filled, at which time the grease constitutes an anti-rattling cushion or packing between the tubes.

From the above description, it will be readily seen that with my invention, the tubes are prevented from rattling by the lubricant which forms a cushion or packing and need not be as accurately fitted as required heretofore, thereby reducing the cost of manufacture of the steering gear. Furthermore, the tubes are lubricated so that they can be more freely operated.

What I claim as my invention is:

1. The combination with a series of relatively movable columns surrounding each other, of a plastic lubricant filler constituting an anti-rattle cushion between said columns and substantially completely filling the spaces therebetween.

2. In a steering gear, the combination with a series of substantially concentric columns, of means for introducing a plastic filler constituting an anti-rattle cushion between said columns to substantially completely fill the spaces therebetween.

3. In a steering gear, the combination with a series of substantially concentric relatively movable columns having apertures therein for placing the spaces between said columns in communication with each other, and bushings at the ends of said columns for closing the spaces, of a lubricant cushion for said columns adapted to be forced through said apertures into the spaces.

4. In a steering gear, the combination with an outer stationary tube, a rotatable concentric second tube within said outer tube, a stationary concentric third tube within said second tube, a rotatable fourth member within said third tube, said second and third tubes having apertures therein, and bushings between said tubes near their opposite ends, of a lubricant cushion for said tubes filling the spaces therebetween and adapted to be forced through said apertures.

5. In a steering gear, the combination with an outer stationary tube, a rotatable concentric second tube within said outer tube, a stationary concentric third tube within said second tube, a rotatable concentric fourth tube within said third tube, a rotatable concentric fifth member within said fourth tube, said first, second, third and fourth tubes having apertures therein, and bushings between said tubes near their opposite ends, of a lubricant cushion for said tubes filling the spaces therebetween and adapted to be forced successively through the apertures in said first, second, third, and fourth tubes.

6. The combination with relatively movable spaced apart columns, one of which surrounds the other, of a plastic filler between said columns and constituting an anti-rattle cushion substantially completely filling the space therebetween.

In testimony whereof I affix my signature.

DONALD T. HASTINGS.